Dec. 7, 1943.   J. P. WOODS   2,336,206
SEISMOGRAPH AMPLITUDE CONTROL
Filed June 23, 1939   3 Sheets-Sheet 1

Inventor: John P. Woods
By his Attorney

Dec. 7, 1943.  J. P. WOODS  2,336,206
SEISMOGRAPH AMPLITUDE CONTROL
Filed June 23, 1939  3 Sheets-Sheet 2
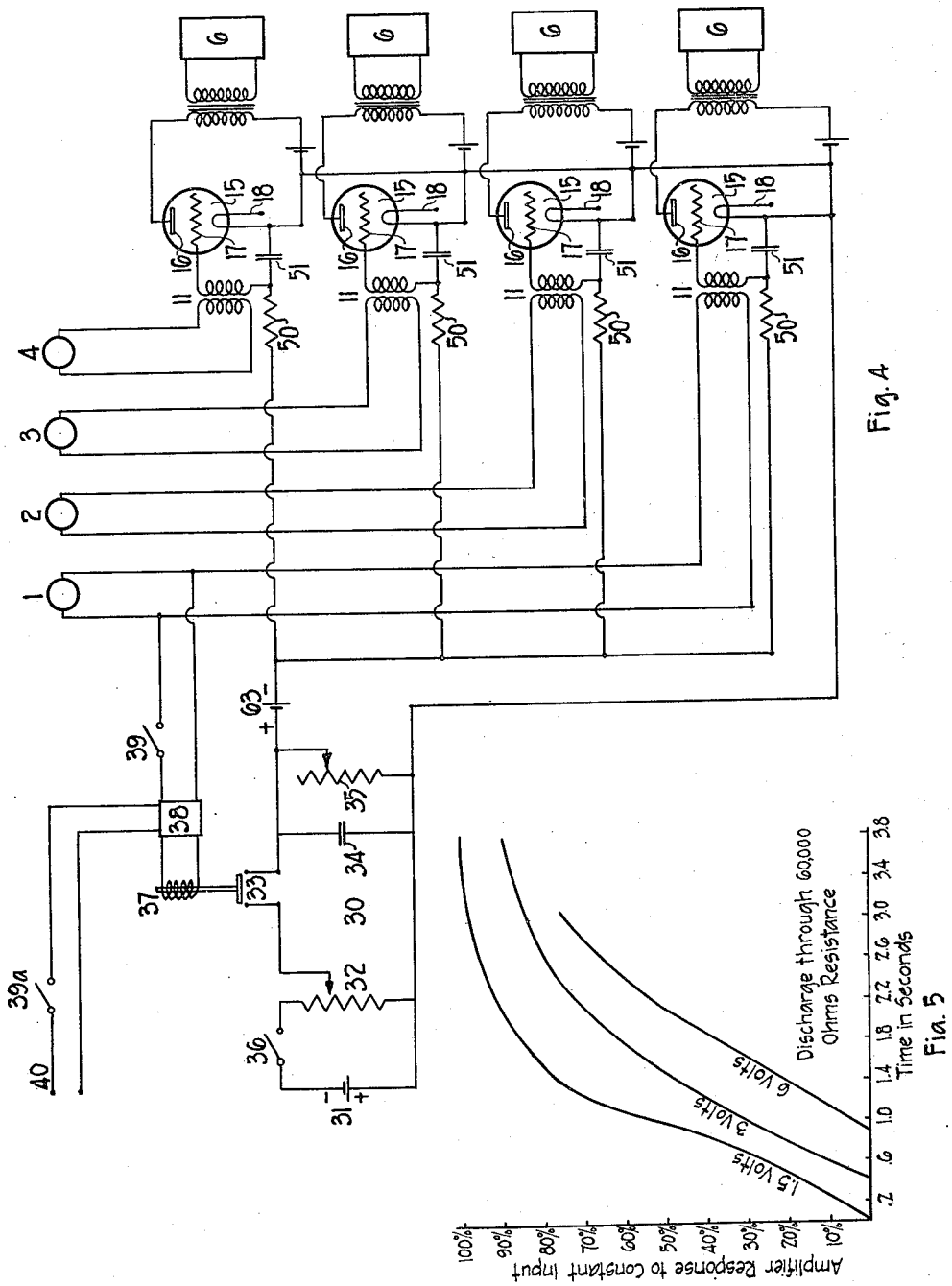
Inventor: John P. Woods
By his Attorney:

Dec. 7, 1943.    J. P. WOODS    2,336,206
SEISMOGRAPH AMPLITUDE CONTROL
Filed June 23, 1939    3 Sheets-Sheet 3
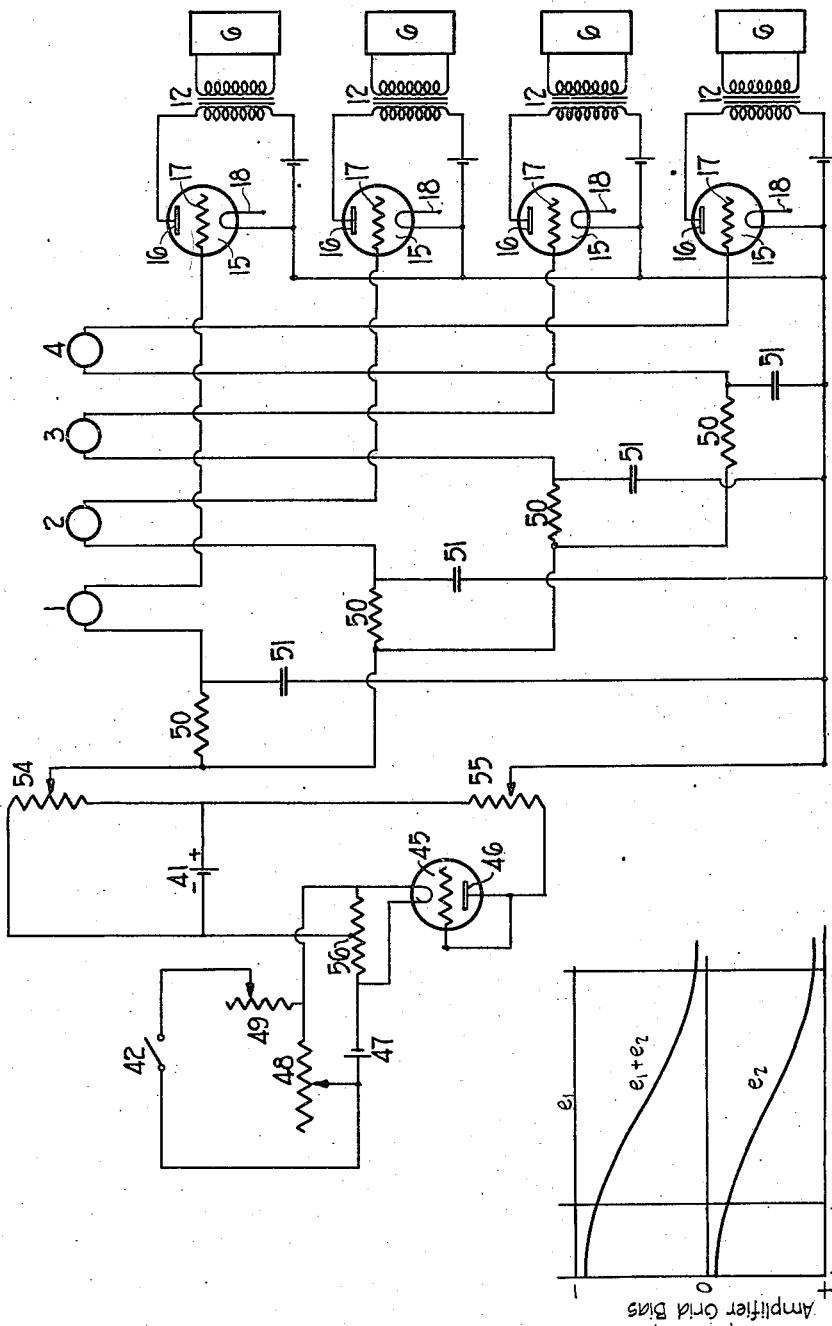
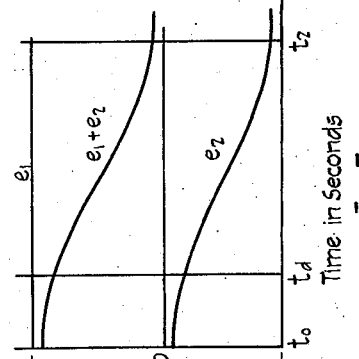
Fig. 6
Fig. 7
Inventor: John P. Woods
By his Attorney:

Patented Dec. 7, 1943

2,336,206

UNITED STATES PATENT OFFICE 2,336,206

SEISMOGRAPH AMPLITUDE CONTROL

John Price Woods, Houston, Tex., assignor to Shell Development Company, San Francisco, Calif., a corporation of Delaware Application June 23, 1939, Serial No. 280,766

2 Claims. (Cl. 177—352)

This invention pertains to seismic exploration methods, and relates more specifically to an amplifying and recording system whereby the electrical impulses generated by detectors or seismometers in response to mechanical disturbances in the ground are amplified, the amplitude or volume of the amplified impulses is automatically controlled and said amplified impulses are recorded.

Seismic exploration consists of surveying geological formations and determining the oriented location of underground strata with a view to locating structures favorable to the accumulation of valuable deposits, such as mineral oil.

In seismic methods of exploration, a disturbance artificially generated in the ground, for example, by means of an explosive charge, is transmitted in the form of ground waves to a plurality of detectors or seismometers wherein the mechanical energy of the ground vibrations or waves is translated into electrical impulses, which are electrically transmitted to a recorder capable of registering or photographically recording said impulses in the form of seismograms. Suitable amplifiers are usually interposed between the seismometer and the recorder.

The impulses or vibrations thus recorded are valuable for the purposes of seismic exploration, and it is desirable that they be clearly decipherable on the seismograms. However, the intensity of the impulses changes very greatly, depending upon the length of their travel path from the origin of the disturbance to the seismometers and upon the nature of the impulses.

In particular, in using the so-called seismic reflection method, the recorder receives from the seismometers and records, first, the impulses which have travelled either substantially in a straight line from the origin of the disturbance to the seismometers, or by a shorter time path if such exists, without in either event penetrating deeply into the ground. Progressively later impulses to arrive may have followed increasingly long paths downward into the ground and suffered reflection by a subsurface layer or layers before reaching the seismometers.

Since the amount of energy delivered to the seismometers by the impulses travelling substantially direct or minimum time paths and by those reflected from shallow depths is very much greater than that delivered by reflected impulses from greater depths, considerable difficulties are encountered in finding a suitable method for recording the volume of these various impulses in such a manner as to produce substantially equal amplitudes throughout the length of a seismogram, which is desirable in order to render all impulses equally decipherable.

Thus, if a sufficiently low volume amplification is used to permit the recorded oscillations due to substantially direct and/or refracted impulses to remain within the limits of the seismogram track assigned to them, the reflected impulses are not amplified in a sufficient measure to permit a desired detailed study and interpretation of the oscillations due to these reflected impulses.

If, on the other hand, a volume amplification is used which is sufficiently high to give a graph record of reflected impulses having a proper amplitude, that part of the seismogram in which the substantially direct and/or refracted wave oscillations are recorded becomes, especially in multi-element recorders, entirely illegible and meaningless due to the repeated crossing and mixing of the several graph lines, and to their tendency to jump entirely off the seismogram track.

It is, therefore, an object of this invention to provide a system for automatically controlling the volume of the amplified electrical impulses recorded on a seismogram, whereby more nearly uniform oscillation amplitude may be obtained on the record track.

It is also an object of this invention to provide a system wherein said amplification gain or volume is automatically controlled as a function of time.

It is also an object of this invention to provide a system wherein said amplification gain or volume is controlled by superimposing on the detector voltage delivered to the recorder through the amplifier a transient or tapering voltage generated by means of a control circuit electrically connected thereto.

It is also an object of this invention to effect this amplification volume control by modifying the negative grid bias of the amplifier tubes, thereby varying the output current of said tubes.

It is also an object of this invention to effect this amplification volume control by means of a control circuit comprising an auxiliary condenser or vacuum tube, the output current of said control circuit being adapted to modify the negative grid bias applied to the amplifier tubes.

These and other objects of the present invention will be understood from the following description taken with reference to the attached drawings, wherein:

Fig. 1 diagrammatically shows the arrangement of apparatus used in seismic reflection exploration.

Fig. 4 is a diagram of a preferred embodiment of the present amplification control system.

Fig. 5 is a diagram showing variations with time of amplifier response for various values of negative grid bias.

Fig. 6 is a diagram of another preferred embodiment of the present amplification control system.

Fig. 7 is a diagram showing grid bias decay curves obtained with the system of Fig. 6.

Figure 1:
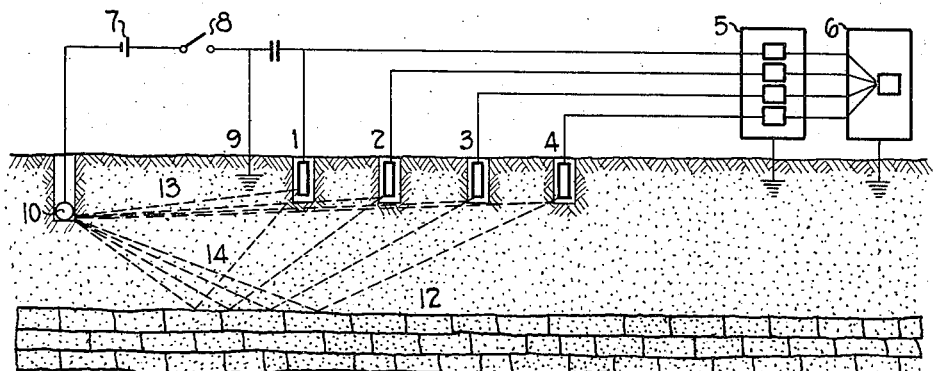

Referring to Fig. 1, numeral 10 indicates the shot point, 1, 2, 3 and 4 are seismometers buried in the ground, of which it is understood that any desired number, such as 8, 12, 16, 32, etc., may be used. Electrical amplifying devices are schematically shown at 5, and electrical recorders or galvanometers at 6. A reflecting subsurface layer is shown at 12.

When a charge is exploded at 10 by closing the switch 8 of an electrical igniting circuit comprising a battery 7, mechanical vibrations generated in the ground by the explosion travel through the ground to the seismometers in the form of direct or refracted waves generally indicated at 13, and in the form of reflected waves generally indicated at 14.

The mechanical energy of the waves is transformed by the seismometers into electrical impulses which are suitably amplified by the amplifiers 5 and recorded by the recorder 6, each seismometer, amplifying stage or stages, and a galvanometer or recorder element forming what is known as one channel.

Figure 2:
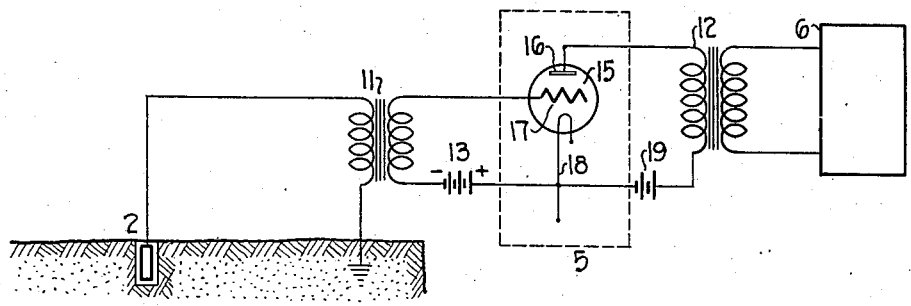
Fig. 2 shows a seismograph channel comprising a detector, an amplifier and a recorder.

One of such channels is schematically shown in Fig. 2 and may include a detector, an amplifier generally indicated at 5, and a recorder 6.

The amplifier 5, which is for simplicity shown to consist of a single amplifying stage, is electrically coupled to the detector and to the recorder by means, for example, of transformers 11 and 12, respectively, although direct coupling may likewise be used, and comprises a vacuum tube 15 having a plate 16, a grid 17, and a cathode 18. The plate is supplied with some suitable source of potential 19. A battery, or any other desirable source of potential 13, is connected in the grid circuit and serves to impress a suitable negative potential or bias on the grid 17. Since the output or plate current is a function of the potential of grid 17, the magnitude of said current, or in other words, the amplification sensitivity of the tube, and the volume or magnitude of the impulses transmitted from the detector and amplified by tube 15, can be controlled by regulating the potential applied to the grid 17.

Figure 3:
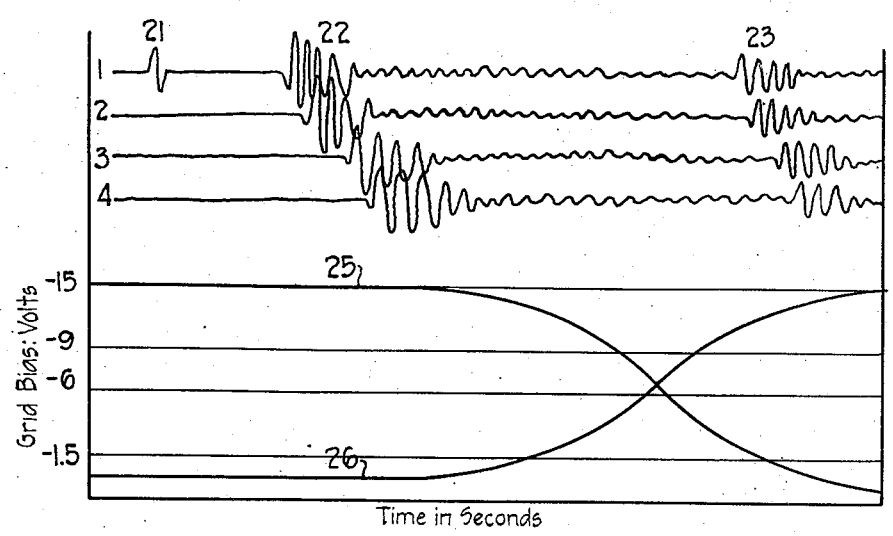
Fig. 3 shows a four-track seismogram superimposed on grid bias decrease and amplification gain curves.

Lines 1—4 in the upper portion of Fig. 3 represent the oscillation graphs recorded on a seismogram by means of the apparatus of Fig. 1, impulse 21 indicating the moment of explosion, 22 indicating the impulses generated by the earliest arriving waves, and 23 impulses generated by reflected waves arriving to the detectors 1—4. Since, as explained above, the use of a constant amplification gain for first and subsequent arrivals of impulses would result in imperfect or even meaningless seismograms, it becomes necessary to regulate the amplification sensitivity of the amplifier so as to change it from a low value, used at the moment of recording of first arriving impulses, to a relatively high value, as indicated by curve 26 in the lower portion of Fig. 3.

This can be conveniently effected by regulating the grid bias of the amplification tube or tubes, since a change in the negative potential applied to the grid from a value of, for example, —7.5 or —15 volts to a value of, for example, —1.5 volts, as shown by curve 25, results in an increase of the amplifier gain of the system by a factor of several thousand.

Since, in view of the relatively very small values of the time elements involved, it is preferable to control the amplification gain or volume automatically, the present invention provides for this purpose an auxiliary control circuit capable of automatically delivering a variable bias potential to the grid of the amplifier tubes, whereby the earliest arriving seismic waves are amplified with a substantially smaller amplification gain than subsequently arriving waves.

A preferred type of circuit used for this purpose is shown in Fig. 4, which shows the four detectors 1—4 of Fig. 1 connected to the recording devices 6 through the amplifiers, which are shown for simplicity in the form of a single amplifying tube 15 for each channel, it being understood that in actual work a plurality of such amplifying tubes may be used for each channel, the control circuit of the present invention being adapted to be connected to the grid of any one of such tubes, such, for example, as the second tube. The impulses generated by the detectors 1—4 are applied to the grids 17 of their respective amplifier tubes by means of the transformers 11, although the detectors may likewise be connected to said grids directly, instead of inductively, as shown, for example, in the embodiment of the present invention illustrated in Fig. 6. A negative bias is impressed on the amplifier tubes by means of an auxiliary control circuit generally indicated at 30. This auxiliary circuit comprises a cell or battery 31, of a suitable voltage rating, such as 7.5 or 15 volts, a rheostat or variable resistance 32, such, for example, as 200 ohms, switches 33 and 36, a condenser 34 having a suitable capacity such, for example, as 8 microfarads, and a variable resistance 35, of a suitable value, such as 30,000 or 80,000 ohms, in parallel therewith. The resistance 35 is connected across the output terminals of the auxiliary circuit 30, so that a voltage generated by passing the condenser discharge current through the resistance 35 is applied between the grids and the filaments of the amplifier tubes 15.

A battery or cell 63 may be, if desired, inserted between the output of the control circuit and the grids of the tubes 15 to insure that a bias having a suitable minimum negative value, such, for example, as —1.5 volts, will be applied to the grids of the amplifier tubes regardless of the output potential of the control circuit. Resistances or impedances 50 and condensers 51 are connected in the grid circuits of the amplifiers 15 to prevent a mixing of energy between the channels of the several detectors and to eliminate the effect of any high frequency variations existing in the voltage applied to the grid.

In operation, a variable negative bias of decreasing magnitude is applied to the amplifier grids by means of the auxiliary control circuit 30 in the following manner:

Previous to firing the explosive charge 10, the condenser 34 is charged to any desired potential, such as 1.5, 7.5, or more volts by closing switches 36 and 33 and properly adjusting the variable resistance 32. The resistance 35 is adjusted at the same time to give a desired rate of condenser discharge.

At the moment of explosion, or at a desired time interval from the closing of the switch 8 detonating the charge, switch 33 is opened either manually, or automatically, for example, as shown in Fig. 4, by means of a relay 37 electrically connected either to the terminals 40 of the firing contact circuit or to the circuit of any of the detectors 1–4, switches 39 and 39a and a suitable amplifying device 38 being interposed between said relay and said contact or detector circuits. The condenser is then discharged through the resistance 35, the current decaying exponentially according to the equation:

$$i = i_0 e^{-t/(rC)}$$

A decaying negative potential is therefore applied to the grids of the several amplifiers 15, and the amplification gain and recorder response is varied with time substantially as an inverse function of the decrement of the decaying current in a manner shown by the curve 26 of Fig. 3.

Fig. 6 shows another embodiment of the present invention wherein the four detectors 1–4 of Fig. 1 are shown directly connected to the recording devices 6 through the amplifiers, which are again shown for simplicity in the form of single amplifying tubes 15 for each channel, it being understood that either the direct or the inductive method of coupling may be used in the systems of either Fig. 4 or Fig. 6. The impulses generated by the detectors are applied to the grids 17 of their respective amplifying tubes, while a negative bias is impressed on said tubes by applying between the grid 17 and the cathode 18 of each amplifying tube a negative potential derived from passing an electric current through resistances 54 and 55 connected in series and arranged in two parallel circuits comprising a common source of E. M. F. 41, such as a cell, battery, etc. In series with resistance 55 is a suitable auxiliary vacuum tube 45 having a plate 46 connected to one terminal of the cell 41 through the resistance 55, while the other terminal of cell 41 is connected to a midpoint 56 of the filament circuit of tube 45. The filament circuit of said tube 45 is heated by the current from a battery or source of E. M. F. 47 arranged in series with a resistance 48, while a resistance 49 and a switch 42 are connected in parallel with resistance 48.

Due to this arrangement, the negative bias applied to the grids 17 of the amplifying tubes 15 is the potential drop $e_1$ derived from resistance 54 plus the potential drop $e_2$ derived from resistance 55. This potential drop or negative bias may be made to vary as a function of time by means of the following arrangement illustrated by the curves of Fig. 7.

At the beginning of the operations, that is, just prior to exploding the charge, the circuit is adjusted so that a constant negative potential $e_1$, shown as a straight line in Fig. 7, and having any desired magnitude, such, for example, as —15 volts, is applied to the grids of tubes 15 due to the passage of the current from cell 41 through resistance 54. The switch 42 being kept open, the variable resistance 48 in the filament circuit of tube 45 is adjusted so that the filament is only slightly heated, resulting in a very small current flowing through resistance 55 to give a positive potential drop $e_2$, which opposes and modifies the negative potential drop $e_1$. Since the potential $e_2$ is at this moment very near zero, the resultant algebraic sum $e_1+e_2$ has still a strongly negative value, as shown at $t_0$ in Fig. 5.

The switch 42 is closed at a desired time interval or simultaneously with the closing of the switch 8 detonating the charge or with the arrival of the first waves to any of the detectors, which may be effected either manually by means of switch 42, or automatically by substituting for said switch the relay switch 37 illustrated in Fig. 4, it being understood that these switches 37 and 42 can be used interchangeably in the circuits of either Fig. 4 or Fig. 6. The closing of switch 42 puts the resistance 49 in parallel with resistance 48, thereby decreasing the effective resistance of the filament circuit of tube 45. A larger filament current is, therefore, supplied to said tube, resulting in a larger output or plate current and in an increase of the positive potential $e_2$, whereby the absolute value of the resultant negative potential $e_1+e_2$ is decreased.

Since it requires a significant interval of time for the filament of tube 45 to become heated to its maximum value after the closing of the switch 42, the increase of the positive potential $e_2$, and the corresponding decrease of the resultant negative potential $e_1+e_2$ takes place gradually and results respectively in curves of the general shape $e_2$ and $e_1+e_2$ shown in Fig. 7.

If, therefore, the earliest arriving waves reach the detectors 1–4 at a time $t_a$, it will be seen that at this time the tubes 15 will still have a strong negative bias applied to their grids. The amplification gain of the system will therefore be small, and the volume of the large initial impulses from detectors 1–4 will be amplified by a relatively small factor.

When, however, the subsequently arriving weaker ground waves reach the detectors, for example, after a time lapse of from 1 to 5 seconds, the negative bias $e_1+e_2$ will have had time to drop to substantially its minimum value, such, for example, as —1.5 volts, as shown at $t_2$, whereby a correspondingly stronger amplification of the reflected impulses will be made possible.

The characteristics of the various amplifier and auxiliary circuits may be selected and adjusted in a manner understood by those familiar with the art in order to regulate the magnitude of the voltages $e_1$ and $e_2$, the time factor necessary for the voltage $e_2$ to change from its steady maximum to its steady minimum value, and to control in a desired manner the shape of the curves $e_1$ and $e_1+e_2$ along which the voltage changes takes place, whereby the amplifier or recorder response curves may be given any desired shape similar to those illustrated in Fig. 5.

Suitable resistances or impedances 50 and condensers 51 are connected between the grid and filament circuits of the tubes 15 to prevent a mixing of energy between the channels of the several detectors, and to eliminate the effect of any high frequency variations existing in the voltage $e_1+e_2$.

I claim as my invention:

1. A control circuit for thermionic tube amplifiers used for seismic recording, said circuit comprsiing a control tube, means for passing a heating current through the filament of said tube, means for altering the intensity of said heating current substantially simultaneously with the beginnings of a seismic recording period, whereby the temperature of said filament and the output current of said tube are caused to vary between an initial and a final value during said period of recording, and means for applying to said amplifier tubes a bias potential derived from said output current.

2. A control circuit for thermionic tube amplifiers used for seismic recording, said circuit comprising a control tube, two resistances connected in series between the plate and the mid point of the filament circuit of said tube, a source of E. M. F. having its positive terminal connected between said resistances and its negative terminal connected to said mid point, means for applying to said amplifier tubes a bias potential derived from the current passing through one of said resistances, means for applying to said amplifier tubes a bias potential derived from the current passing through the control tube and the other resistance, said two bias potentials being in opposition to each other, and means for varying said second bias potential, said means comprising a resistance in the filament circuit of said control tube, and means for altering the value of said resistance substantially simultaneously with the beginning of a seismic recording period, whereby the intensity of the filament current and of the output current of said control tube are caused to vary between an initial and a final value during the period of recording.

JOHN P. WOODS.